Jan. 6, 1959 R. M. BURLEY 2,867,393
NAVIGATION DEVICE
Filed Jan. 11, 1950 3 Sheets-Sheet 1

INVENTOR.
ROBERT M. BURLEY
BY
ATTORNEY

Jan. 6, 1959 R. M. BURLEY 2,867,393
NAVIGATION DEVICE
Filed Jan. 11, 1950 3 Sheets-Sheet 2
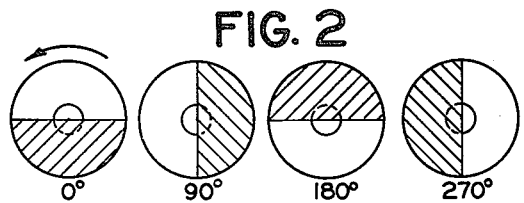
FIG. 2
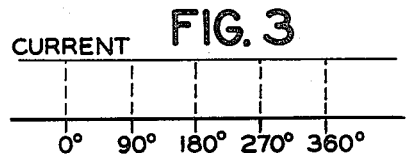
FIG. 3 CURRENT
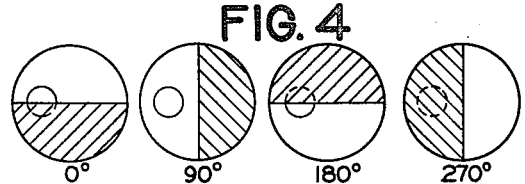
FIG. 4
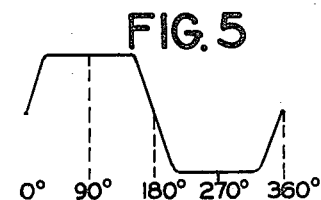
FIG. 5
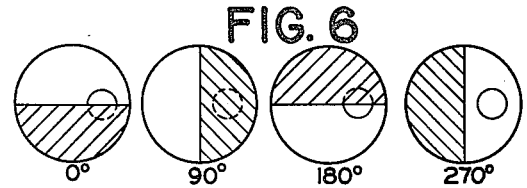
FIG. 6
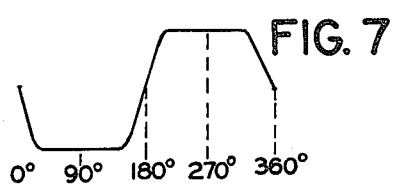
FIG. 7
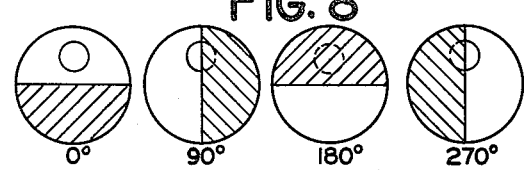
FIG. 8
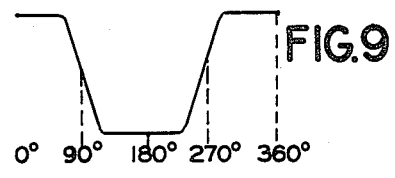
FIG. 9
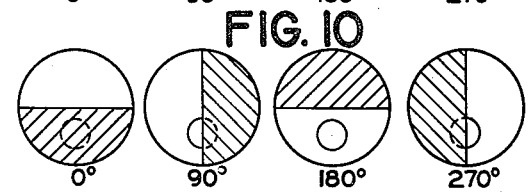
FIG. 10
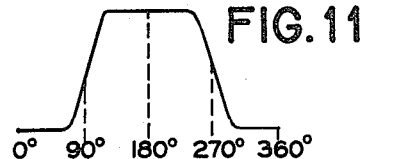
FIG. 11
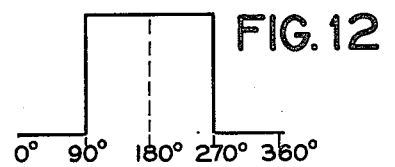
FIG. 12
AZIMUTH REFERENCE
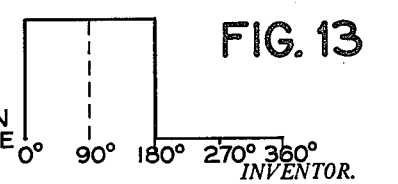
FIG. 13
ELEVATION REFERENCE
INVENTOR.
ROBERT M. BURLEY
BY
ATTORNEY Jan. 6, 1959     R. M. BURLEY     2,867,393
NAVIGATION DEVICE
Filed Jan. 11, 1950     3 Sheets-Sheet 3
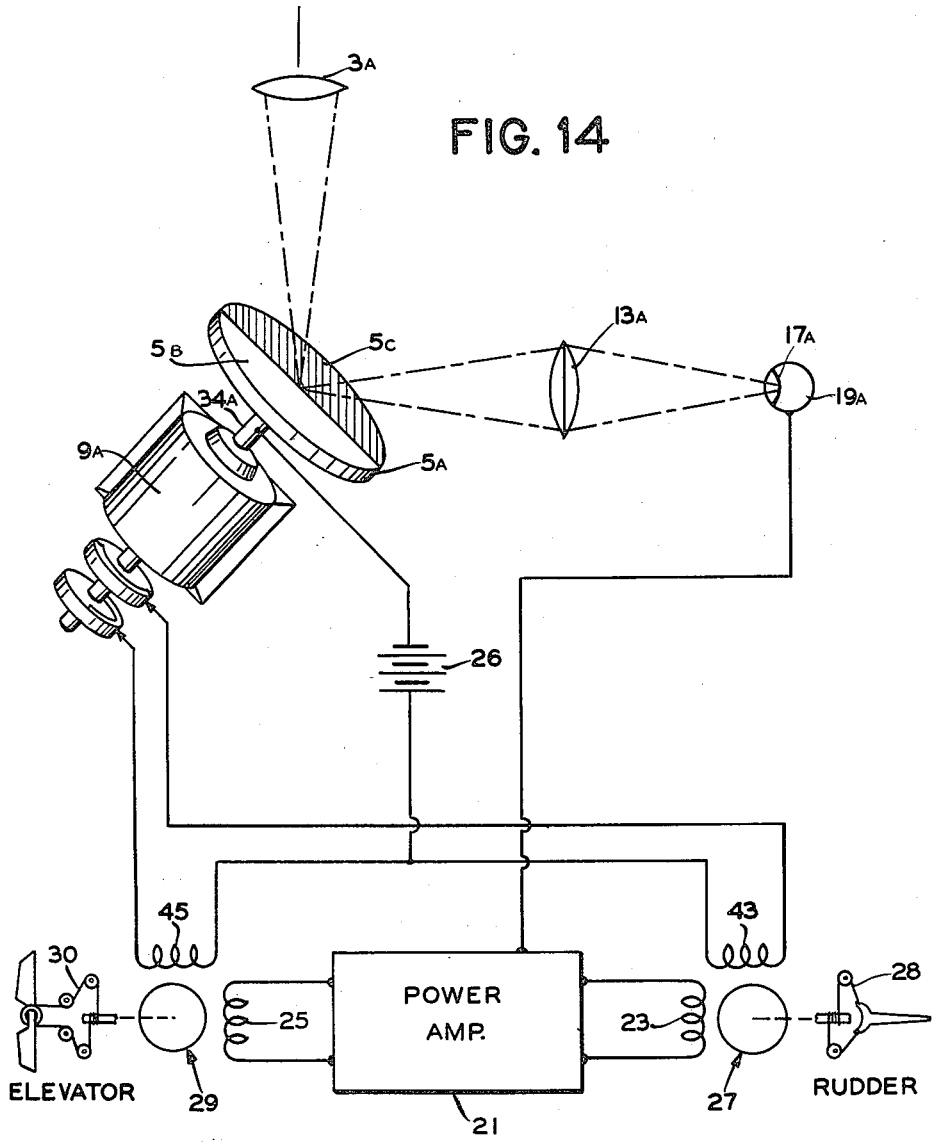
INVENTOR.
ROBERT M. BURLEY
BY
ATTORNEY United States Patent Office 2,867,393
Patented Jan. 6, 1959

2,867,393

NAVIGATION DEVICE

Robert M. Burley, Syosset, N. Y., assignor to Bendix Aviation Corporation, Teterboro, N. J., a corporation of Delaware Application January 11, 1950, Serial No. 137,977

3 Claims. (Cl. 244—77)

The invention relates to navigation devices and more particularly to a device in which a celestial body may be used as a reference.

One object of the invention is to provide a celestial navigator for automatically guiding ships, aircraft or other moving vehicles on a prescribed course.

Another object is to provide a device for indicating the location of the ship, aircraft or other moving vehicle on which the device is mounted.

Another object is to provide a relatively simple celestial navigator of high accuracy.

Another object is to provide a device which is always directed toward a predetermined source of radiant energy to which the device is responsive.

Another object is to provide a device responsive to rays from a source of radiant energy and including a single means sensitive to the rays and providing a signal having phase components in quadrature with one another corresponding to the deviation of the device about mutually perpendicular axes relative to the source.

The invention contemplates directing the rays from a celestial body or other suitable source of radiant energy on means sensitive to such rays. The rays are occulted periodically by a shutter or other suitable means. When a constant quantity of energy falls on the sensitive means irrespective of the position of the shutter, a uniform signal is produced. When the quantity of energy falling on the sensitive means varies with the position of the shutter, an undulating signal is produced which has phase components in quadrature with one another corresponding to the deviation of the device about mutually perpendicular axes relative to the source.

The signal may be used for any suitable purpose, and in the present arrangement the signal is impressed on the variable phases of a pair of reversible motors. Reference voltages in quadrature with one another and 90° out of phase with the signal components and of the same frequency as the signal are impressed on the fixed phases of the motors. The phase relationships of the associated signal components and reference voltages determine the directions of rotation of the motors.

The motors may be used to orient the device in azimuth and elevation to an attitude in which a constant quantity of energy falls on the sensitive means, or the motors may drive the controls of the craft mounting the device to maintain the craft on a prescribed course.

The foregoing and other objects and advantages of the invention will appear more fully hereinafter from a consideration of the detailed description which follows, taken together with the accompanying drawings wherein two embodiments of the invention are illustrated. It is to be expressly understood, however, that the drawings are for the purposes of lilustration and description only, and are not to be construed as defining the limits of the invention.

In the drawings, Figure 1 is a diagrammatic view of the optical system and electric circuit of a novel celestial navigator constructed according to the invention.

Figures 2, 4, 6, 8 and 10 show the relative positions of the shutter and rays from the celestial body or other source as the shutter rotates.

Figures 3, 5, 7, 9 and 11 show the signals produced by the means responsive to the rays for the relative positions of the rays and shutter shown in Figures 2, 4, 6, 8 and 10, respectively.

Figures 12 and 13 show the reference voltages and their phase relations to the signals; and Figure 14 is a diagrammatic view of a celestial navigator having a modified optical system and shutter.

Figure 1:
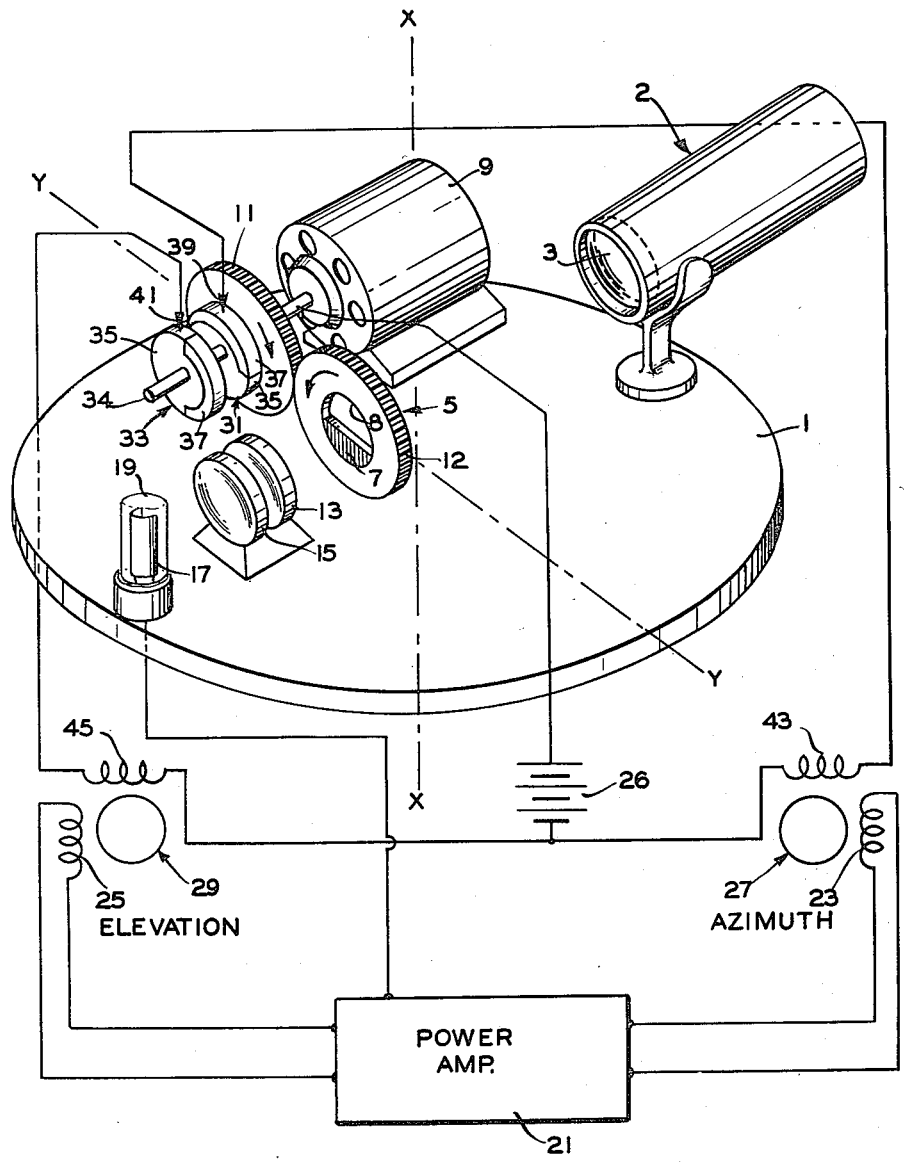

Referring now to the drawings for a more detailed description of the novel celestial navigator of the present invention, the latter is shown in Figure 1 as including a platform 1 mounting an optical system having a telescope 2 with an objective lens 3. A shutter 5 with a semicircular opaque portion 7 and a semicircular translucent portion 8 is rotated by a motor 9 through a gear 11 meshing with the toothed periphery 12 of the shutter. The shutter rotates at the same speed as the motor to periodically occult the light from the body. The telescope is directed toward a celestial body, such as a star, so that light from the body is focused on the plane of the shutter.

Collecting lenses 13, 15 concentrate the rays passed by the shutter on the photo cathode 17 of a photo tube 19. When the star image is centered on the rotation axis of the shutter, as shown in Figure 2, a constant amount of light falls on the photo cathode and the photo tube produces a uniform current, as shown in Figure 3. When the optical system is displaced so that the star image is to the left of the rotation axis of the shutter, as shown in Figure 4, the amount of light falling on the photo cathode varies periodically with the position of the shutter, and the photo tube produces an undulating current, as shown in Figure 5. When the optical system is displaced so that the star image is to the right of the rotation axis of the shutter, as shown in Figure 6, the amount of light falling on the photo cathode varies periodically with the position of the shutter, and the photo tube produces an undulating current, as shown in Figure 7, 180° out of phase with the current of Figure 5. When the optical system is displaced so that the star image is above the rotation axis of the shutter, as shown in Figure 8, the photo tube produces an undulating current, as shown in Figure 9, 90° out of phase with the current of Figure 5. When the optical system is displaced so that the star image is below the rotation axis of the shutter, as shown in Figure 10, the photo tube produces an undulating current, as shown in Figure 11, 180° out of phase with the current of Figure 9. The phase of the current is determined by the direction of displacement of the optical system relative to the celestial body.

The signal from the photo tube is amplified by a power amplifier 21 which preferably converts the square wave signal to its fundamental and produces a voltage of substantially sine wave form. The amplified signal is impressed on the variable phases 23, 25 of reversible two-phase motors 27, 29.

A pair of commutators 31, 33 is affixed to the motor shaft 34 and rotate at the same speed as shutter 5. Each commutator has a conducting portion 35 extending 180° and a non-conducting portion 37 extending 180°. The conducting portions of commutators 31, 33 are displaced angularly 90° relative to one another. Conducting portions 35 are connected in parallel with one another to a direct current source. Brushes 39, 41 engage commutators 31, 33, respectively. Fixed phase 43 of motor 27 is connected to brush 39 and battery 26, and fixed phase 45 of motor 29 is connected to brush 41 and battery 26.

Commutators 31, 33 produce reference voltages in quadrature with one another and of the same frequency as the signal, as shown in Figures 12 and 13, respectively.

Motors 27, 29 will operate whenever there is a component of the signal 90° out of phase with the associated reference voltage and the motors will rotate in one direction or the other, depending upon whether the signal component leads or lags the reference voltage. Motor 27 may be arranged to rotate platform 1 in azimuth about a vertical axis X and motor 29 may be arranged to rotate platform 1 in elevation about a horizontal axis Y to maintain telescope 2 directed to the celestial body used as a reference. A suitable indicator may be provided to indicate movement of the optical system relative to a reference index and the position of the craft mounting the apparatus may be determined automatically at all times. Also, as shown in Figure 14, motors 27, 29 may be drivingly connected to the controls 28, 30 of the craft on which the device is mounted to guide the craft on a predetermined course.

When the optical system is displaced so that the star image is to the left of the rotation axis of the shutter, as shown in Figure 4, the resulting signal shown in Figure 5 lags 90° behind the reference voltage of Figure 12, and motor 27 rotates in one direction. The signal is in phase with the reference voltage of Figure 13 and motor 29 remains at rest. When the optical system is displaced so that the star image is to the right of the rotation axis of the shutter, as shown in Figure 6, the resulting signal shown in Figure 7 leads the reference voltage of Figure 12 by 90° so that motor 27 rotates in the opposite direction. The signal is 180° out of phase with the reference voltage of Figure 13, so that motor 29 remains at rest.

When the optical system is displaced so that the star image is above the rotation axis of the shutter, as shown in Figure 8, the resulting signal shown in Figure 9 lags 90° behind the reference voltage of Figure 13 and motor 29 rotates in one direction. The signal is 180° out of phase with the reference voltage of Figure 12 and motor 27 remains at rest. When the optical system is displaced so that the star image is below the rotation axis of the shutter, as shown in Figure 10, the resulting signal shown in Figure 11 leads the reference voltage of Figure 13 by 90° and motor 29 rotates in the opposite direction. The signal is in phase with the reference voltage of Figure 12 and motor 27 remains at rest.

When the optical system is displaced so that the star image is in a position intermediate the positions shown in Figures 4, 6, 8 and 10, the signal will be displaced relative to the reference voltage through an angle corresponding to the angular position of the star image on the shutter, and the signal will comprise components 90° out of phase with the reference voltages, and both motors 27, 29 will operate to center the telescope on the celestial body used as a reference. When the telescope is centered on the celestial body and the image is centered on the shutter as shown in Figure 2, the uniform voltage shown in Figure 3 is blocked by amplifier 21 and the variable phases 23, 25 of motors 27, 29 are de-energized and both motors remain at rest.

Motor 9 may be driven at any desired speed to provide a signal and reference voltages of any desired frequency which will operate the reversible motors. In the arrangement described, a signal and reference voltages of 42 cycles per second preferably is used to avoid interference from frequencies now commonly used for other purposes.

The arrangement shown in Figure 14 is substantially the same as the arrangement shown in Figure 1 except that the image from objective lens 3a is focused on a shutter 5a mounted on shaft 34a of motor 9a. The shutter includes a semicircular reflecting portion 5b and a semicircular non-reflecting portion 5c. The image is reflected by reflecting portion 5b, as shutter 5a rotates, to a collecting lens 13a which concentrates the rays passed by the shutter on the photo cathode 17a of photo tube 19a. The remainder of the structure and its operation correspond to the embodiment described in Figure 1.

The device described is adapted for operation from any desired source of radiant energy, such as visible light, infra-red, ultra-violet, etc., and may include means responsive to such radiation to produce signals as described.

Although square wave forms of the signal and reference voltages are shown in Figures 5, 7, 9, 11, 12 and 13, it should be understood that any suitable wave form may be used. In the arrangement described, when the image on the shutter is displaced a radial distance of less than one-half the image diameter from the axis of rotation of the shutter, the signal is substantially sinusoidal, and upon greater displacement of the image on the shutter, up to approximately two diameters, the signal wave forms assume two constant values connected by sinusoidal connecting portions, and at displacement greater than two diameters, the signal assumes the wave form shown in Figures 5, 7, 9 and 11.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the kind described adapted to be mounted in a craft having azimuth and elevation controls and to maintain the craft on a fixed course, means sensitive to rays from a celestial body, means to direct said rays to said sensitive means, and a member periodically interrupting said rays and cooperating with said sensitive means to produce an undulating signal when the amount of energy falling on said sensitive means varies, means to produce a pair of undulating reference voltages in quadrature with one another, the phase of said signal relative to the phases of said reference voltages being determined by the attitude of said directing means relative to the celestial body, and a reversible motor operating the elevation control of the craft and a reversible motor operating the azimuth control of the craft, each of said motors having a fixed phase connected to the reference voltage means so that the reference voltage of one phase is impressed on the fixed phase of one of said motors and so that the reference voltage in quadrature therewith is impressed on the fixed phase of the other motor, and each of said motors having a variable phase connected to said sensitive means and being energized by the signal so that said motors operate the controls of the craft when the signal has components 90° out of phase with the reference voltages.

2. In a device of the class described adapted to be mounted in a craft having azimuth and elevation controls and to maintain the craft on a fixed course, sensitive means exposed to rays from a celestial body, means for directing the rays to said sensitive means, and a member periodically interrupting said rays and cooperating with said sensitive means to produce signals when the amount of energy received by said sensitive means from said rays varies, means to produce a pair of reference voltages in quadrature with one another, the phase of the signal relative to the phases of said reference voltages being determined by the attitude of said directing means relative to the celestial body, and reversible motors for operating the azimuth and elevation controls of the craft and responsive to said signals and reference voltages to maintain the craft on a fixed course.

3. In a device of the class described adapted to be mounted in a craft having azimuth and elevation controls and to maintain the craft on a fixed course, sensitive means exposed to rays from a celestial body, a member periodically interrupting said rays and cooperating with said sensitive means to produce signals when the amount of energy received by said sensitive means from said rays varies, said signals having phase components in quadrature with one another corresponding to the deviation of the craft from its course, means to produce a pair of reference voltages in quadrature with one another and ninety degrees out of phase with the phase components of the signals, and motive means for operating the azimuth and elevation controls of the craft, each of said motive means being responsive to a reference voltage and to a phase component of the signals.

References Cited in the file of this patent

UNITED STATES PATENTS

| | | |
|---|---|---|
| 1,999,646 | Wittkuhns | Apr. 30, 1935 |
| 2,307,941 | Meredith | Jan. 12, 1943 |
| 2,423,336 | Moseley | July 1, 1947 |
| 2,444,933 | Jasperson | July 13, 1948 |
| 2,462,925 | Varian | Mar. 1, 1949 |
| 2,513,367 | Scott | July 4, 1950 |

FOREIGN PATENTS

| | | |
|---|---|---|
| 33,746 | Holland | Oct. 15, 1934 |